United States Patent

[11] 3,593,161

[72] Inventors Gerold Ritz, deceased
late of Stuttgart, Germany;
Erika Ritz, Gerold Ritz and Anna Ritz, all
legal successors, all of Tiengen, Hochrhein,
Germany
[21] Appl. No. 782,009
[22] Filed Dec. 6, 1968
[45] Patented July 13, 1971
[73] Assignee Robert Bosch GmbH
Stuttgart, Germany
[32] Priority Dec. 20, 1967
[33] Switzerland
[31] 18011/67

[54] PULSE COINCIDENCE DETECTION CIRCUIT
6 Claims, 3 Drawing Figs.
[52] U.S. Cl................................................. 328/109,
307/232, 307/234, 328/110
[51] Int. Cl..................................................... H03k 5/20
[50] Field of Search........................................... 307/232,
234, 262; 328/109, 110, 165

[56] References Cited
UNITED STATES PATENTS

| | | | |
|---|---|---|---|
| 2,867,724 | 1/1959 | Olson | 328/44 X |
| 3,019,350 | 1/1962 | Gauthey | 307/218 |
| 3,112,450 | 11/1963 | Krause | 328/109 |
| 3,192,478 | 6/1965 | Metz | 328/44 |
| 3,268,743 | 8/1966 | Nourney | 307/232 X |
| 3,327,226 | 6/1967 | Nourney | 328/110 X |

Primary Examiner—Stanley D. Miller, Jr.
Attorney—Stephen H. Frishauf

ABSTRACT: Simultaneous pulses occurring in two or more pulse trains are suppressed, and only discretely appearing pulses of a minimum time separation are propagated. A circuit detects coincidence, by time-extending a pulse representative of the inverse of the logical conjunction of both pulses. The time-extended, inverted pulse is used as an information signal indicative of noncoincidence to control AND gates to another input of which, the pulses, regenerated from the trailing edges of the pulses of the pulse trains, are applied.

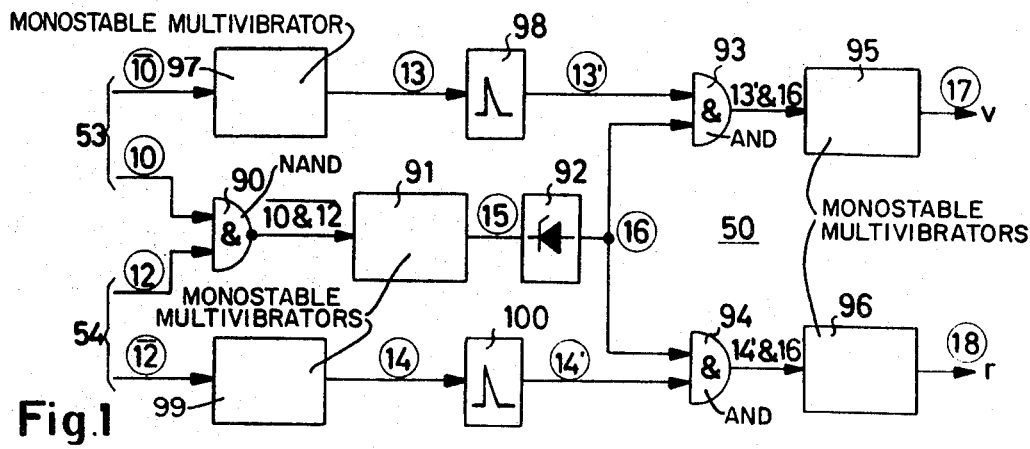
Fig.1
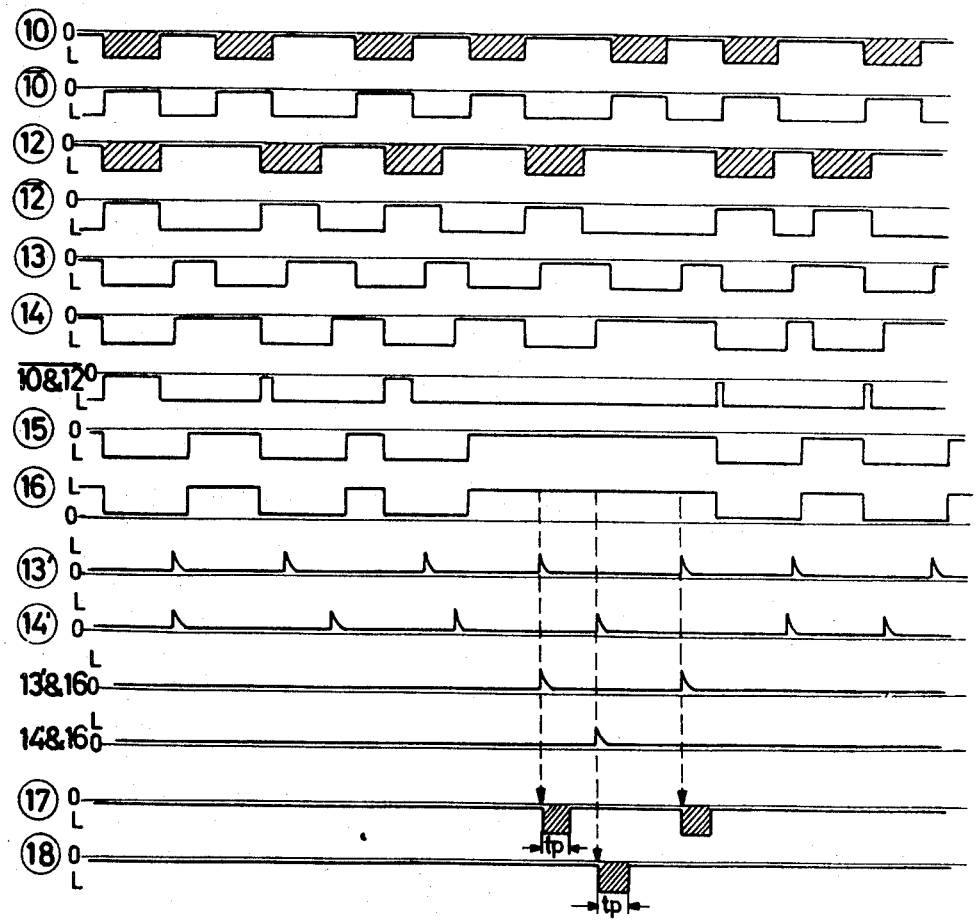
Fig.2
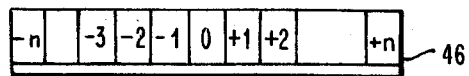
Fig.3
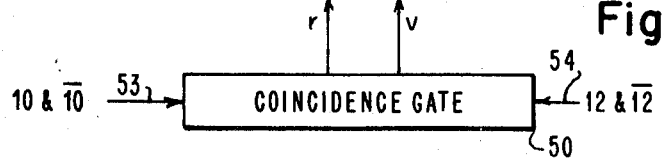
INVENTOR:
GEROLD RITZ

PULSE COINCIDENCE DETECTION CIRCUIT

The present invention relates to a circuit recognizing when one or more pulses is (or are) coincident with another pulse, and more particularly to such a circuit in which the output therefrom is suppressed upon detection of coincidence. The circuit will be described particularly in connection with a digital system to control the slip frequency of an asynchronous dynamoelectric machine, and forming the subject matter of our application Ser. No. 782,008 filed concurrently herewith, and assigned to the assignee of the present invention.

When pulses commanding respectively reversed count directions are to be applied to a bidirectional digital counter, for example a forward-backward counter, pulses applied to one input of the counter tend to cause the counter to count, for example, forwardly; while pulses to the other counter input cause counting in the opposite direction. Application of pulses to both inputs simultaneously, or with time overlap, should be avoided; even if applied, a "forward" count pulse would have no effect on the ultimate count state if cancelled by a "-backward" count pulse; the counter will thus show a substantially steady state count varying, or hunting about a value of zero. To avoid malfunction, overlapping or coincident pulses, or pulses having a time separation below a predetermined value are, desirably, suppressed. The combination of a coincident pulse-suppressing gate with the counter will be substantially insensitive to noise and stray pulses. Accuracy of a digital arrangement is achieved even by using a counter having only low counting capacity.

It is an object of the present invention to provide a pulse coincidence detection and suppression circuit which is simple and effectively inhibits pulses in pulse trains having time overlap, and which is particularly adaptable for use with bidirectional pulse counters.

SUBJECT MATTER OF THE PRESENT INVENTION

Briefly, a NAND gate is provided to detect coincidence of pulses and provide an output which is inverted. The output pulses are time-extended, and provide an information signal which is then indicative of noncoincidence of pulses. The pulses, themselves, are time-extended and the trailing edges of the time-extended pulses of the pulse trains themselves are applied to respective AND gates, controlled by the information signal. The output pulses thus are slightly time-shifted with respect to the input, and separation of the pulses, which do not overlap, is readily obtained by suitable choice of timing of pulse periods of monostable multivibrator circuits in the system.

The structure, organization, and operation of the invention will now be described more specifically with reference to the accompanying drawings, wherein:

FIG. 1 is a schematic circuit diagram of a coincidence circuit to suppress overlapping pulses of a pair of pulse trains;

FIG. 2 is a timing diagram to illustrate the operation of the circuit of FIG. 1; and FIG. 3 illustrates a counter coincidence circuit combination.

FIG. 1 illustrates the circuit of a coincidence gate 50 (FIG. 3). The function of this circuit is to suppress pulses of a pair of simultaneously arriving pulse trains, which at least partially overlap, that is present time-coincidence. Such a circuit suppresses all pulses having coincident arrival, as illustrated in connection with the graph of FIG. 2.

Beside suppressing the pulse, an indicator circuit (such as a flip-flop, the state of which can be sensed) can be triggered.

The coincidence gate of FIG. 1 has two inputs 53,54 and two outputs $v$ and $r$. Input 53 has a pulse train 10, and its inverse $\overline{10}$ applied thereto; input 54 has pulse train 12 and its inverse $\overline{12}$ applied. The pulses are illustrated shaded in FIG. 2, their inverse blank. The notation "O" corresponds to absence of signal, and the notation "L" corresponds to "line active," that is pressure of a pulse or signal, and generally corresponding to a "1" in the binary system.

A NAND gate 90 generates pulses $\overline{10}$ and $\overline{12}$ from pulse trains 10 and 12, as illustrated in FIG. 2. The leading edge of resultant pulse $\overline{10}$ and $\overline{12}$ triggers a multivibrator 91, having at its output a time extended pulse 15, which is level shifted by z bias or level setting stage 92 about a predetermined potential. The output of stage 92 is a pulse train 16 (FIG. 2). The operation of the bias stage 92 will be obvious from a comparison of pulse trains 15 and 16 in FIG. 2. Pulse train 16 is applied to the inputs of a pair of AND gates 93,94, the outputs of which are applied, each, to a monostable multivibrator 95,96, respectively, and having a short pulse duration $t_p$ (short with respect to the duration of the pulses 10 and 12). The output of multivibrator 95 serves as the $v$ output of the coincidence gate 50, supplying pulses 17 if there is no coincidence and the pulse from input 53 occurs before the pulse from input 54. The output of multivibrator 96 is the $r$ output of coincidence gate 50, delivering pulses 18 if there is no coincidence and the pulse from input 54 occurs before the pulse from input 53.

The inverse pulses $\overline{10}$ (second row of FIG. 2) trigger, with their trailing edge, a monostable multivibrator 97. Its output pulses 13 are slightly longer than the pulses 10 and are in phase with it. The trailing edges of pulses 13 are differentiated in a differentiating network 98, result in needle or peak pulses 13', and are applied to the second input of AND gates 93. The inverse pulses $\overline{12}$ (fourth row, FIG. 2) trigger, with their trailing edges, monostable multivibrator 99, having output pulses 14 slightly longer then pulses 12 and in phase with it. The trailing edges of pulse 14 are differentiated in a differentiating network 100, result in needle or peak pulses 14', and are applied to the second input to AND gate 94.

The signal at the output of bias stage 92 is an information signal serving to determine that no coincidence of pulses is present. A signal can be is off from stage 92, inverted, and then may serve as a trigger for a monostable multivibrator supplying a pulse indicative of coincidence. Needle pulses 13' or 14' can trigger multivibrators 95 or 96 only when and if signal 16 has enabled AND gates 93,94, in order that an output impulse 17 or 18 is generated.

FIG. 2 illustrated in the first row pulse train 10, seven pulses and in the third row, pulse train 12, six pulses. These, 13 pulses total, have 10 coincident pulses, so that output $v$ delivers only two pulses 17 and output $r$ only one pulse 18. As will be obvious, similar results are obtained in other cases of coincidence since, upon coincidence of any kind, with respect to time, of two pulses, both are suppressed.

The circuit in accordance with FIG. 1 is particularly useful in combination with a bidirectional pulse counter 46 (FIG. 3), of the type having separate "forward" and "reverse" inputs, because simultaneous activation of both inputs is eliminated— a frequent source of malfunction and incorrect counting. Additionally, the outputs that are not coincident can be clearly separated in time further increasing the accuracy of the counter in combination with the coincidence circuit.

FIGS. 1 and 2, and the above description, shows two pulse trains. More inputs can be handled by circuits in accordance with the present invention, by providing additional channels comprising elements similar to multivibrator 97,99 differentiating network 98,100, AND gate 93,94 and output pulse generator circuit 95,96. The NAND gate 90 then is to be constructed as a plural (that is—more than two) input gate, and the information signal 16 applied as the second input to all of the AND gates 93. Other modifications of the circuit, within the scope of the inventive concept, will be apparent.

It is claimed:

1. Coincidence gate circuit detecting coincidence of pulses applied to a plurality of inputs (53,54), each input having a pulse train applied thereto;

said circuit having a pair of outputs delivering output pulses if, and only if, the pulses of the pulse trains to the inputs are noncoincident, the respective outputs being activated in accordance with the relative occurrence in time, of said input pulses;

said circuit comprising means (97,99) extending in time, separately, the pulses derived from said inputs ($\overline{10}$ and $\overline{12}$);

logic means (90) having said pulses (10,12) applied thereto and having an output signal ($\overline{10}$ and $\overline{12}$) forming the logical conjunction of the presence of one of said signals only and indicative of no time overlap of signals;

circuit means (91) connected to and triggered by the output from said logic means and providing an output information signal (16) of a time duration longer than said input pulses;

conjunctive gates (93,94) having the trailing edges (13', 14') of said time-extended pulses, as well as the information signal (16) applied thereto;

level change means (92) interconnecting said circuit means (91) and said conjunctive gates (93,94), the output of said level change means providing said information signal;

and output means connected each, to a conjunctive gate (93,94), said output means being activated by said conjunctive gates to provide a pulse only if said first monostable multivibrator has no pulse, and simultaneously the trailing edge of a time-extended pulse is present.

2. Circuit according to claim 1 including further pulse generating means (98,100) responsive, respectively, to the trailing edges of said time-extended pulses, and having their respective outputs connected to said conjunctive gates (93,94).

3. Coincidence circuit according to claim 1 having two inputs, and two pulse trains applied thereto, in combination with a bidirectional pulse counter (46) having a forward count input (v) and a reverse count input (r); one output (17) of said coincidence gate circuit being connected to the forward count input (v), and the other (18) to the reverse count input (r) whereby the operation of said counter (46) is stabilized due to suppression of overlapped pulses, and separation of applied pulses by the extension of the pulses tin time.

4. Coincidence gate circuit detecting coincidence of pulses applied to a plurality of inputs (53,54), each input having a pulse train (10,12) applied thereto;

said circuit having a pair of outputs (v,r) respectively activated in accordance with the relative occurrence, in time, of said input pulses, said circuit delivering output pulses (17,18) if, and only if, the pulses of the pulse trains to the inputs are noncoincident;

said circuit comprising means (97,99) providing pulse trains (13,14) time-delayed with respect to the pulses applied to said inputs;

conjunctive logic means (90) connected to said inputs and providing an output ($\overline{10}$ and $\overline{12}$) upon failure to detect simultaneous application of inputs;

means (91) time-extending said output ($\overline{10}$ and $\overline{12}$) to provide a noncoincidence information signal (16);

and output gate means (93,94) responsive
a. to said time-delayed pulses (13,14) 14) and
b. to said information signal, said information signal being applied to said output gate means (93,94) to control said output gate means to deliver output pulse trains having pulses only which are not overlapping.

5. Circuit according to claim 4, wherein said conjunctive logic means include a NAND gate (90) detecting simultaneous applications of inputs and providing an output indicative of the negative of said simultaneous application.

6. Coincidence gate circuit according to claim 4 having two inputs, and two pulse trains applied thereto, in combination with a bidirectional pulse counter (46) having a forward count input (v) and a reverse count input (r); one output (17) of said coincidence gate circuit being connected to the forward count input (v), and the other (18) to the reverse count input (r) whereby the operation of said counter (46) is stabilized due to suppression of overlapped pulses and separation of applied pulses by the time delay of pulses.